May 29, 1923.
G. A. SZABO
1,456,743
APPLIANCE FOR AUTOMATICALLY INDICATING THE AMOUNT OF GASOLINE IN AUTOMOBILE TANKS
Filed Feb. 26, 1921
2 Sheets-Sheet 1
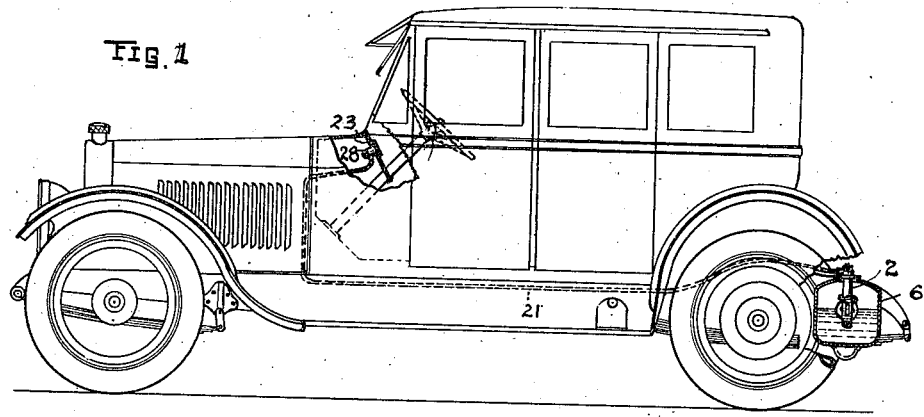
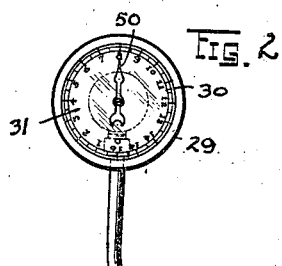
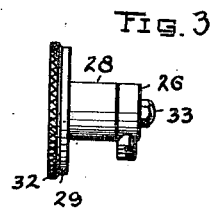
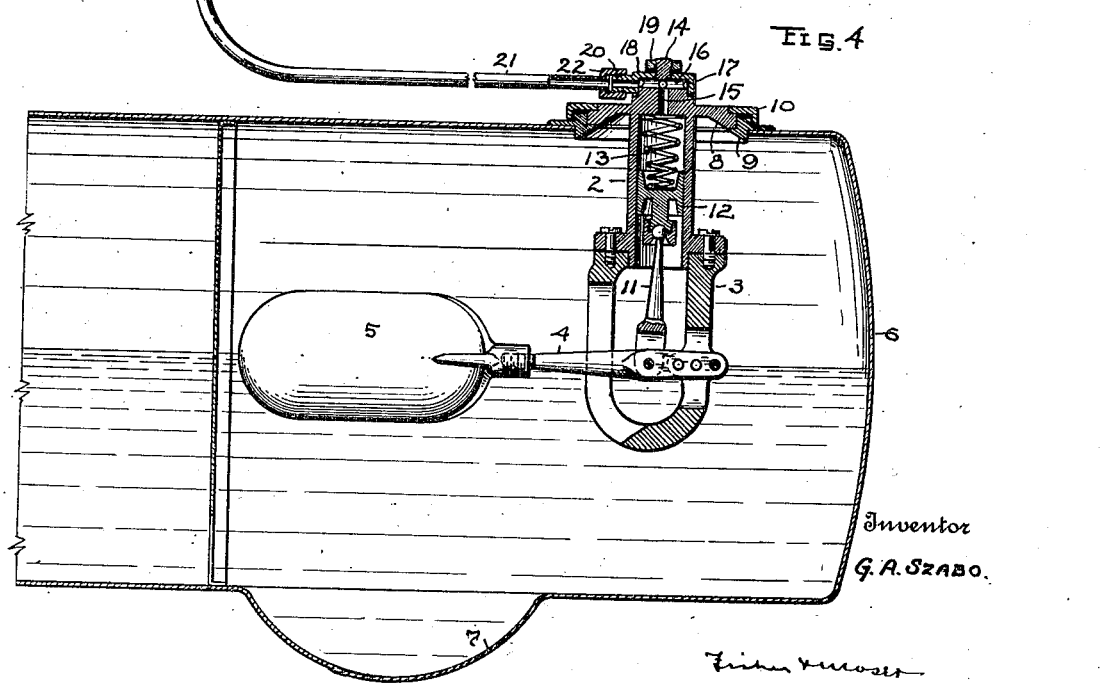
Inventor
G. A. Szabo.
Fisher & Moser
Attorneys

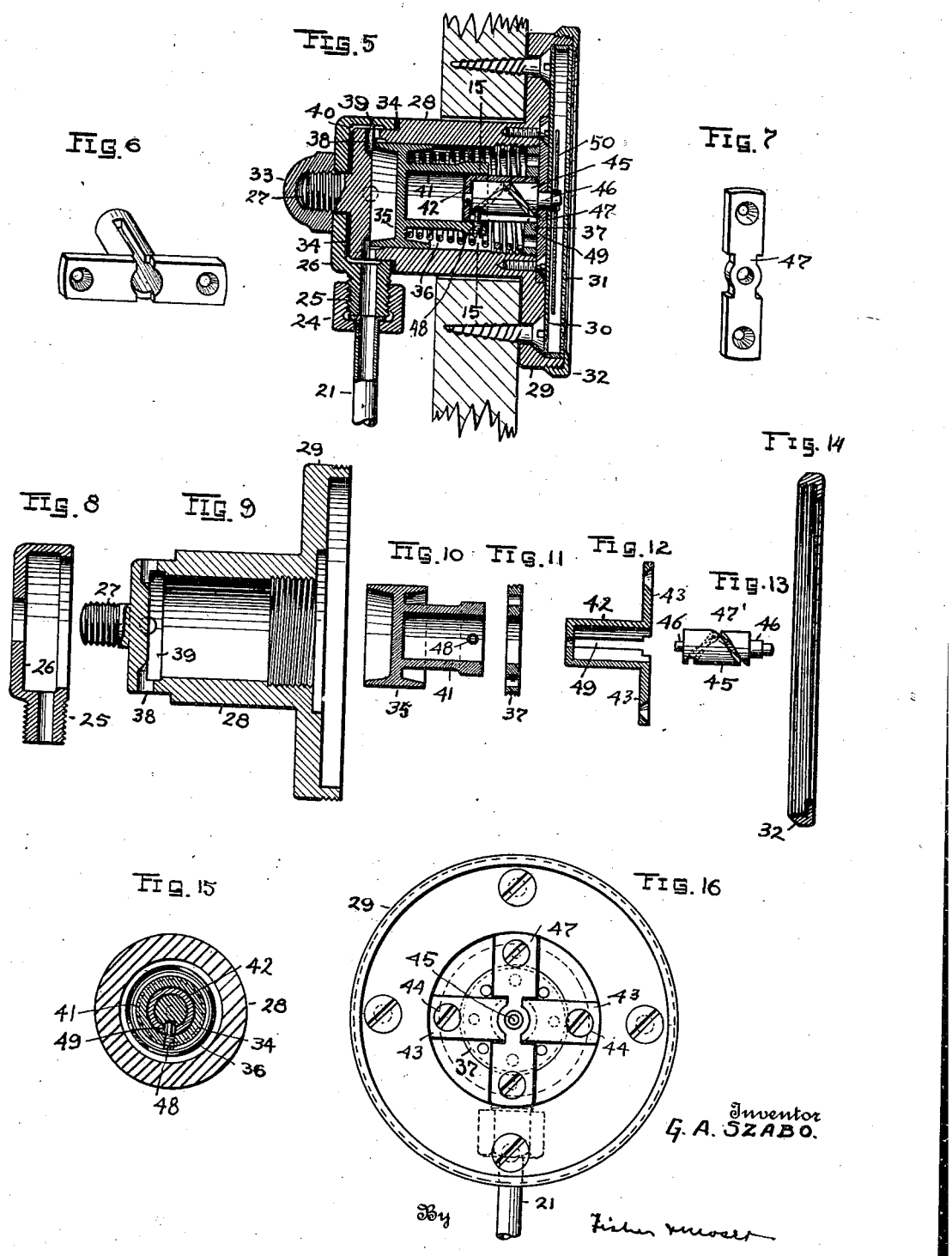
May 29, 1923. 1,456,743
G. A. SZABO
APPLIANCE FOR AUTOMATICALLY INDICATING THE AMOUNT OF GASOLINE IN AUTOMOBILE TANKS
Filed Feb. 26, 1921 2 Sheets-Sheet 2
Inventor
G. A. SZABO.

Patented May 29, 1923.

1,456,743

UNITED STATES PATENT OFFICE.

GEORGE A. SZABO, OF CLEVELAND, OHIO.

APPLIANCE FOR AUTOMATICALLY INDICATING THE AMOUNT OF GASOLINE IN AUTOMOBILE TANKS.

Application filed February 26, 1921. Serial No. 448,235.

*To all whom it may concern:*

Be it known that I, GEORGE A. SZABO, a citizen of the United States, residing at Cleveland, in the county of Cuyahoga and State of Ohio, have invented certain new and useful Improvements in an Appliance for Automatically Indicating the Amount of Gasoline in Automobile Tanks, of which the following is a specification.

The general object of the invention is to provide a register or indicator opposite the driver's seat of an automobile, which will through the medium of compressed air or a fluid respond sensitively to the action of a float-operated compressor in the supply tank at the rear end or other point on the automobile to register the amount of gasoline in the tank.

In the accompanying drawing, Fig. 1 is a side view of an automobile embodying my improved appliance. Fig. 2 is a face view of the indicator, and Fig. 3 a side view thereof. Fig. 4 is a vertical section of one end of a gasoline tank and my float-operated compressor therein. Fig. 5 is a sectional view on an enlarged scale of the indicator, and Figs. 6 to 14, inclusive, are perspective and sectional views of various indicator parts separated. Fig. 15 is a cross section of the indicator on line 15—15 of Fig. 5. Fig. 16 is a front view of the indicator with the cover and index plate and needle removed.

The apparatus comprises a compressor cylinder 2 having a detachable yoke 3 to which an operating arm 4 is adjustably pivoted. An elongated float 5 is removably affixed to the free end of the arm, and this float and compressor are removably suspended within a gasoline tank 6 having an offset 7 within its bottom side within which the float is adapted to retire when the gasoline in the tank is at its lowest level. The compressor cylinder embodies an annular flange 8 at its upper end which is adapted to be removably seated within a collar 9 affixed to the upper side of tank 6, and a screw ring 10 is used to couple the parts together. The bottom end of cylinder 2 is open and a rod 11 connects arm 4 by a ball joint with a piston 12 which is under the constant pressure of a helical spring 13 seated within the upper end of the piston. The head of the cylinder extends above flange 8 and has a screw-threaded projection 14 centrally thereof and also an axial passage 15 which communicates with a series of lateral ducts 16 opening into an annular channel 17 surrounding the round extension at the upper end of the head of the cylinder. A flanged cap 18 is sleeved over projection 14 to enclose annular channel 17, and a nut 19 clamps this cap in a sealed seating position upon the head and also in an adjustable position rotarily in respect to the tank so that its threaded nipple 20 at one side thereof may be placed in any desired radial position and coupled by a nut 22 to a relatively small pipe 21 extending from tank 6 to the instrument board 23 at the front of the driver's seat in the automobile.

The opposite end of pipe 21 is attached by a second coupling nut 24 to the threaded nipple 25 of a round flanged cap 26 which is sleeved over a screw-threaded projection 27 at the base end of a cylindrical indicator casing 28 having a dished or recessed head 29 at its front end within which an indexing dial 30 is removably seated opposite a glass plate 31 which is held in place by a screw ring 32. A nut 33 engaged with projection 27 clamps the cap 26 detachably and adjustably rotarily upon the reduced rear extremity of indicator body 28 and sealing washers 34 are interposed between said body and cap at the joints. Body 28 has a round chamber within which a plunger 35 is adapted to be moved forwardly when float 5 rises and forces the air or fluid out of compressor into and through pipe 21, and a coiled spring 36 confined between plunger 35 and an adjustable ring nut 37 engaged with the interior screw threads at the front end of casing 28 shifts plunger 35 rearwardly when float 5 descends and relieves the pressure within the compressor and pipe. The fluid is free to flow into and out of body 28 by way of radial ducts 38 and annular channels 39 and 40 formed within the body 28 and cap 26, respectively.

Plunger 35 has a hollow reduced extension 41 at its front side which is loosely sleeved over a round cylindrical member 42 having lateral arms 43 affixed by screws 44 within the front face or bottom of the dished head or flange 29 of body 28, and a rotatable spindle 45 is rotatably mounted within a longitudinal bore of extension 42 upon short end trunnions 46 having bearing within the inner end of the extension and within a cross piece 47 seated within the outer end of the bore and extending at right angles to arms 43, see Fig. 16. Spindle 45 has a spiral groove 47' of steep pitch within which the reduced extremity of a screw 48 is adapted to extend, said screw being projected and fastened within one side of plunger extension 41 and the reduced extremity of the screw passing through a longitudinal side slot 49 in the fixed member 42. This arrangement permits the plunger to slide without turning and causes the spindle to turn more or less dependent upon the distance of travel of the plunger, and the degree of rotation or oscillation imparted to the spindle is indicated at the front of index plate 30 by a needle 50, thereby apprising the driver of the automobile at all times of the amount of liquid contained within the tank, both during the operation of the automobile or in filling the tank.

What I claim is:

1. An appliance for automatically indicating the amount of liquid within a supply tank, comprising an indicator casing having a spring-pressed plunger therein, a cylindrical member affixed to said casing in sleeved connection with said plunger, a spindle with a spiral groove rotatably mounted within said cylindrical member, means connected with said plunger operating within said spiral groove, an index member affixed to said spindle, an index dial mounted upon said casing opposite said index member, a pipe connection adapted to convey a fluid behind said plunger.

2. An appliance for automatically indicating the amount of liquid within a supply tank, comprising an indicator casing having a plunger therein, a slotted cylindrical member having arms affixed to said casing opposite said plunger, a spirally-grooved spindle rotatably confined within said cylindrical member, means extending through the slotted member operably connecting said spindle and plunger together, an index member affixed to said spindle, and a bearing piece for the spindle affixed at its ends to said casing opposite said slotted member.

3. An appliance for automatically indicating the amount of liquid within a supply tank, comprising a cylindrical casing having a reduced annular end provided with an axial screw-threaded projection and radial fluid passages, a movable piston within said casing, a flanged cap adapted to encircle said reduced annular end and to sleeve over said projection having a screw-threaded nipple, a sealing washer interposed between said cap and casing, and a nut engaged with said projection in locking engagement with said cap.

4. An appliance for automatically indicating the amount of liquid within a supply tank, comprising an indicator casing, a plunger within said casing having a hollow extension, a round slotted member within said extension having arms, means fixing said arms to said casing, a screw in said extension projecting into said slotted member, a spirally-grooved spindle within said member engaged by said screw having an indicator, a cap member detachably and rotarily affixed to the rear end of said casing having a pipe-coupling nipple, and fluid passages within said casing and cap in open communication with said nipple and plunger.

Signed at Cleveland, in the county of Cuyahoga, and State of Ohio, this 21st day of February, 1921.

GEORGE A. SZABO.